United States Patent
Ottesen et al.

[11] Patent Number: 5,870,241
[45] Date of Patent: Feb. 9, 1999

[54] METHOD AND APPARATUS FOR EVASIVE MANEUVERING TO KEEP DASD HEADS AWAY FROM PROTRUDING SURFACE DEFECTS

[75] Inventors: Hal Hjalmar Ottesen; Gordon James Smith, both of Rochester, Minn.

[73] Assignee: International Business Machines Corporation, Armonk, N.Y.

[21] Appl. No.: 757,621

[22] Filed: Nov. 26, 1996

[51] Int. Cl.⁶ ............................. G11B 5/596; G11B 7/00
[52] U.S. Cl. .................................. 360/77.02; 360/77.04; 360/53; 369/53
[58] Field of Search ........................... 360/77.02, 77.03, 360/77.04, 77.01, 78.01, 78.14, 75, 69, 48, 49, 53, 39; 369/47, 48, 54, 58, 59, 32

[56] References Cited

U.S. PATENT DOCUMENTS

| | | |
|---|---|---|
| 3,675,118 | 7/1972 | Booth . |
| 3,781,117 | 12/1973 | Laycak et al. . |
| 4,500,964 | 2/1985 | Nickle . |
| 4,881,136 | 11/1989 | Shiraishi et al. . |
| 5,068,842 | 11/1991 | Naito . |
| 5,150,050 | 9/1992 | Genheimer et al. . |
| 5,167,032 | 11/1992 | Martin et al. . |
| 5,202,887 | 4/1993 | Ueno et al. . |
| 5,235,585 | 8/1993 | Bish et al. . |
| 5,249,288 | 9/1993 | Ippolito et al. . |
| 5,303,219 | 4/1994 | Kulakowski et al. . |
| 5,313,626 | 5/1994 | Jones et al. . |
| 5,319,627 | 6/1994 | Shinno et al. . |
| 5,388,105 | 2/1995 | Takagi et al. . |
| 5,424,638 | 6/1995 | Huber . |
| 5,623,470 | 4/1997 | Asthana et al. ...................... 369/54 X |
| 5,715,221 | 2/1998 | Ito et al. ............................... 369/58 X |

OTHER PUBLICATIONS

IBM Technical Disclosure Bulletin vol. 38 No. 05 May 1995 "Distingushing Between Media Flaws and Contamination in Optical Drives" by E. J. Klodnicki, pp. 371–376.

Primary Examiner—Muhammad N. Edun
Attorney, Agent, or Firm—Joan Pennington

[57] ABSTRACT

Apparatus and a method are provided for mapping aperities or protruding disk defects in a data storage disk file. A protruding disk defect is identified and a head and disk interference value is measured. The measured head and disk interference value is compared with a predetermined threshold value. A severity value is determined responsive to the compared values and stored with a location of the identified protruding disk defect. A no-idle zone is defined relative to the location of the identified protruding disk defect based upon the severity value and a geometry of an airbearing slider. Evasive maneuvering is performed to avoid slider and transducer head contact with the identified protruding disk defect.

19 Claims, 11 Drawing Sheets

DEFECT TABLE 400

| DEFECT # | RADIUS | ANGLE | SEVERITY |
|---|---|---|---|
| 1 | R1 | $\theta 1$ | S1 |
| 2 | R2 | $\theta 2$ | S2 |
| 3 | R3 | $\theta 3$ | S3 |
| 4 | R4 | $\theta 4$ | S4 |
| *<br>*<br>* | *<br>*<br>* | *<br>*<br>* | *<br>*<br>* |
| N-1 | RN-1 | $\theta$N-1 | SN-1 |
| N | RN | $\theta$N | SN |

METHOD AND APPARATUS FOR EVASIVE MANEUVERING TO KEEP DASD HEADS AWAY FROM PROTRUDING SURFACE DEFECTS

FIELD OF THE INVENTION

The present invention relates generally to a direct access storage device (DASD), and more particularly to a method and apparatus for intelligent, adaptive, and evasive maneuvering of the DASD recording heads to minimize the probability of a head crash during seek, track follow, and idle modes.

DESCRIPTION OF THE PRIOR ART

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

Data located on a particular track on a disk surface is read or written by properly positioning a data transducer head directly over the track. In order to maintain the head in proper position over the data track, track-following servo systems often are incorporated into disk drives. Servo position control is used to position the data heads in registration with the data information tracks. A sector servo system uses the data heads as servo transducers in a time multiplexed fashion. As a head is following a particular track on a rotating disk, the head will pick up data information and servo information alternately. Servo information, interlaced with data information, is prewritten on the disk surfaces at manufacturing time within narrow radial sectors as spokes on a wagon wheel. A servo system that interlaces data and servo information is commonly referred to as sector servo or embedded servo. Another servo system uses a dedicated servo transducer head to read position signals recorded in servo information tracks on a dedicated disk surface. The data heads are ganged with the servo head for simultaneous movement relative to the data information tracks and the servo information tracks. To access the disk drive unit, a feedback sector servo controlled drive system locates the head in a desired position, where data is to be written or read.

One of the reasons for magnetic recording heads crashing of a disk surface, for example, causing catastrophic failure is the presence of protruding disk defects or asperities. The manufacturing glide test screens disk drives for unacceptable disk asperities in order to reduce the probability of a crash. Typically there are usually no more than one or two protruding defects in a disk drive at the time the drive is failed at the manufacturing glide test. Some of the disk defects also, are grown during the life of the drive. These defects include ding marks, pits, gouges, protruding disk defects or thermal asperities. Current methods for handling these defects are based on data error rates. Bad data sectors, with frequent and recurring data errors, are reassigned to other areas of a disk. This in-situ sector reassignment is recorded in a defect table that is stored within the disk drive.

A problem with this conventional method of in-situ sector reassignment is that the nature of the defect remains unknown. For example, both a magnetic void and a protruding disk defect or bump in a particular data sector typically cause severe data errors and result in a sector reassignment. Suppose that an error occurred on surface #1, track #2345, and sector #67. The rest of the data sectors on surface #1, track #2345 might be perfectly good. If the defect was a pit or a magnetic void, the rest of the data sectors on surface #1, track #2345 could continue to be used. A pit or a void does not lead to a head crash problem.

With a protruding defect at sector #67, the rest of the data sectors on surface #1, track #2345 should not be used. Each time cylinder #2345 is accessed there is an increased probability for head #1 to make mechanical contact with the bump, causing physical damage that may lead to a head crash. Extended idling on or close to cylinder #2345 would be very detrimental to the life of the drive. Also having a seek trajectory that coincides with cylinder #2345, and sector #67 would be very detrimental to the life of the drive.

In seeking through a zone containing a protruding defect, it becomes important the slider does not hit the defect while seeking. Hitting or flying over this defect is not a rare event. For example, a slider seeking across a zone in the middle of the databand (MD) has a significant probability of a slider interfering (hitting) the rotating defect, for example, once in 25 seeks across the zone. In the case that the slider hits the defect, a roll mode of the slider may be triggered causing potential surface scratching. In addition, it is quite likely that disk debris will result from the contact. This debris can accumulate on the airbearing surface and can significantly change the flying characteristics.

A need exists for method and apparatus for intelligent, adaptive, and evasive maneuvering of the DASD recording heads during seek, track follow, and idle modes to minimize head crashes with protruding disk defects. Such method and apparatus are needed both for increasing the yield from manufacturing glide testing of DASDs and for increasing the useful life of the DASD.

SUMMARY OF THE INVENTION

Important objects of the present invention are to provide methods and apparatus that avoid or greatly minimize head crash problems due to the intermittent contact between a recording head and a disk asperity during normal disk drive operation; to provide such methods and apparatus for significantly increasing the life of a disk drive; to provide such methods and apparatus substantially without negative effects and that overcome some disadvantages of prior art arrangements.

In brief, apparatus and a method are provided for mapping defects in a data storage disk file. A protruding disk defect is identified and a head and disk interference value is measured. The measured head and disk interference value is compared with a predetermined threshold value. A severity value is determined responsive to the compared values and stored with a location of the identified protruding disk defect.

In accordance with features of the invention, a no-idle zone is defined relative to the location of the identified protruding disk defect. Evasive maneuvering is performed to avoid a transducer head contact with the identified protruding disk defect.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
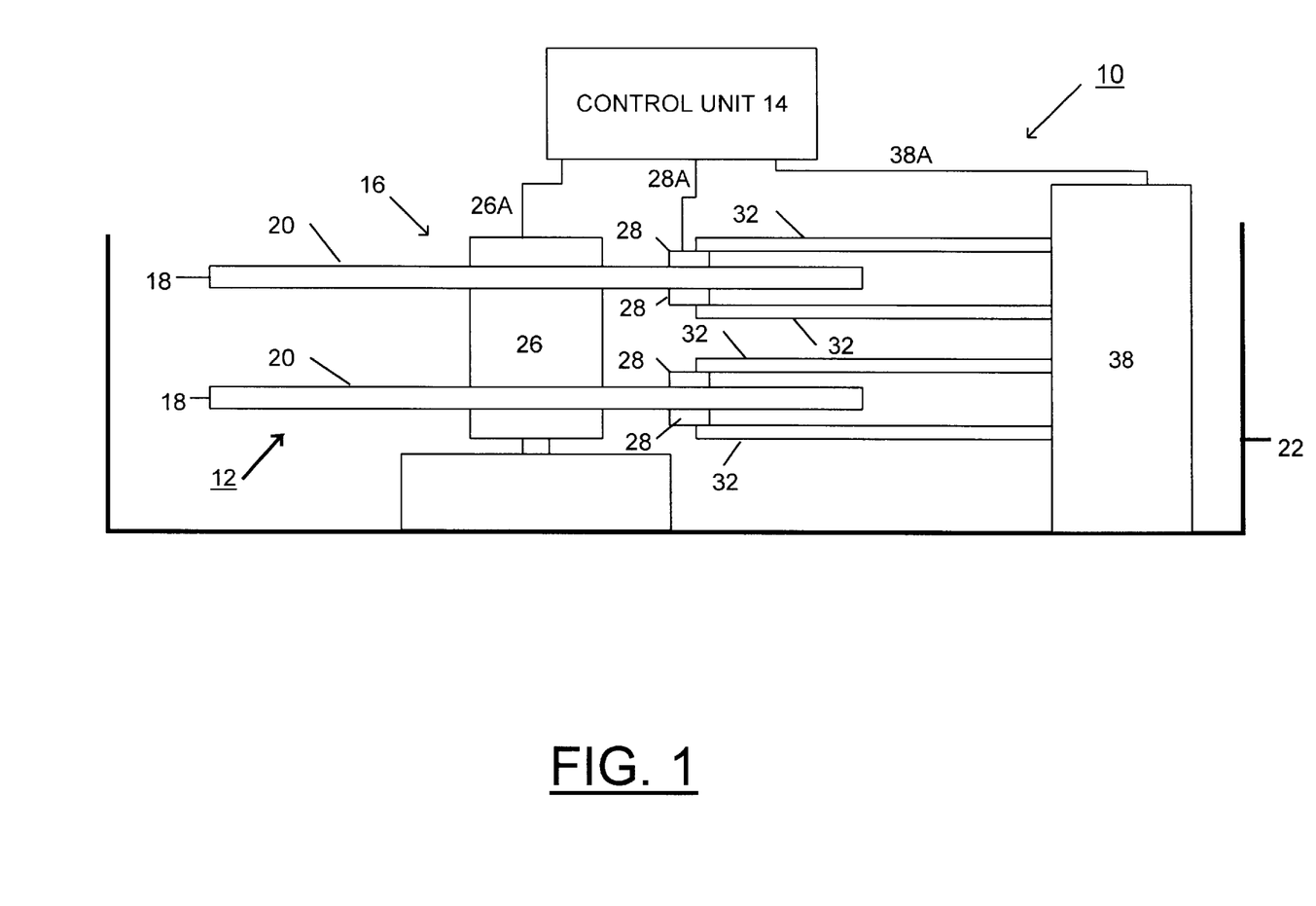
FIG. 1 is a schematic and block diagram of a data storage disk file embodying the present invention.
Figure 2:
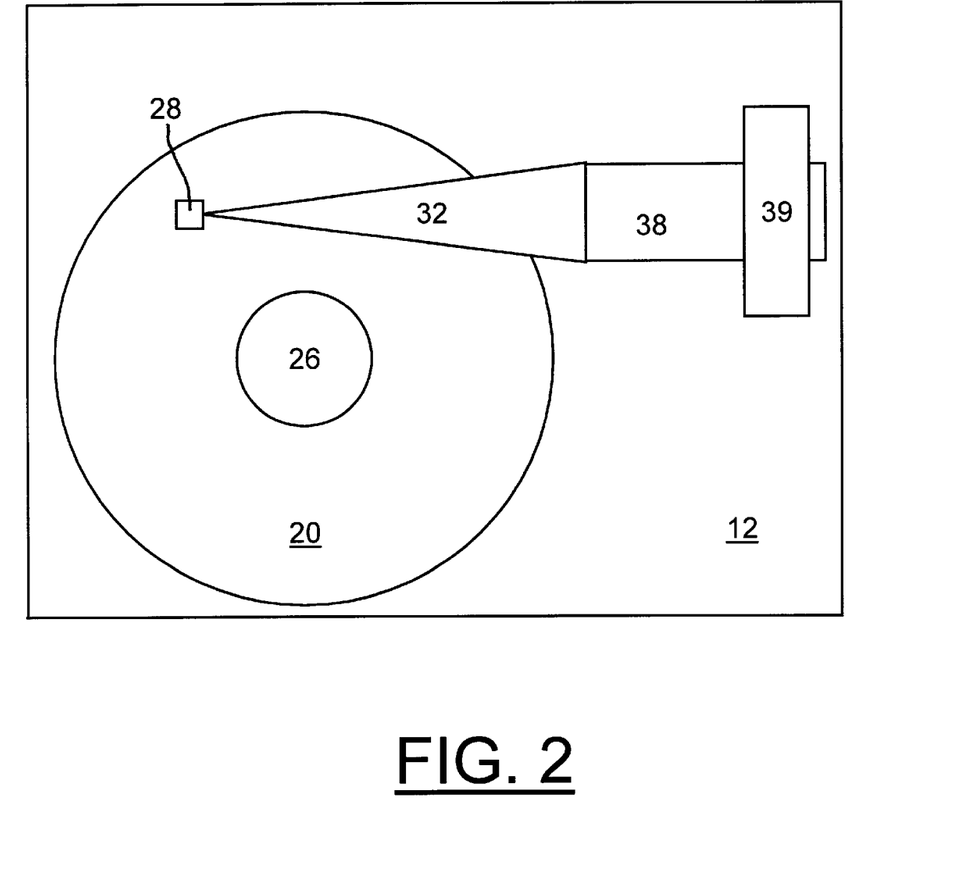
FIG. 2 is a schematic and block diagram plan view of the data storage disk file FIG. 1.

Having reference now to the drawings, in FIG. 1 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction.

The disk drive unit 12 includes a stack 16 of disks 18 each having at least one magnetic surface 20. The disks 18 are mounted parallel to one another within a housing 22 for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head assembly 28 is carried by an arm 32. The arms 32 are ganged together for simultaneous pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read.

The disk drive unit 12 is controlled in operation by signals provided by the control unit 14, including motor control signals on line 26A and head position control signals on line 38A. In a typical arrangement, control unit 14 provides an interface with a computer that provides data read and write commands, and data signals are transmitted to or from the transducer head assemblies over corresponding lines 28A, one of which is seen in FIG. 1. Servo position information is recorded on the disk surfaces 20, and the transducer head assemblies 28 read this servo information to provide a servo position signal to the control unit 14. This information is employed by the control unit 14 to provide position control signals on line 38A. The purpose of this position feedback system is to assure accurate and continuous positioning of the transducer head assemblies 28 so that data is written to and read from precise locations on the disk surfaces 20.

The control unit 14 employs servo control operations illustrated and described with respect to FIGS. 5, 6, 7, and 8 to move the data head assemblies 28 radially with respect to the rotating disks to selectively align each of the data transducer heads with a specific radial position of the cylinder where data is to be read or written, while avoiding head crash problems in accordance with the preferred embodiment of the invention.

Figure 3A:
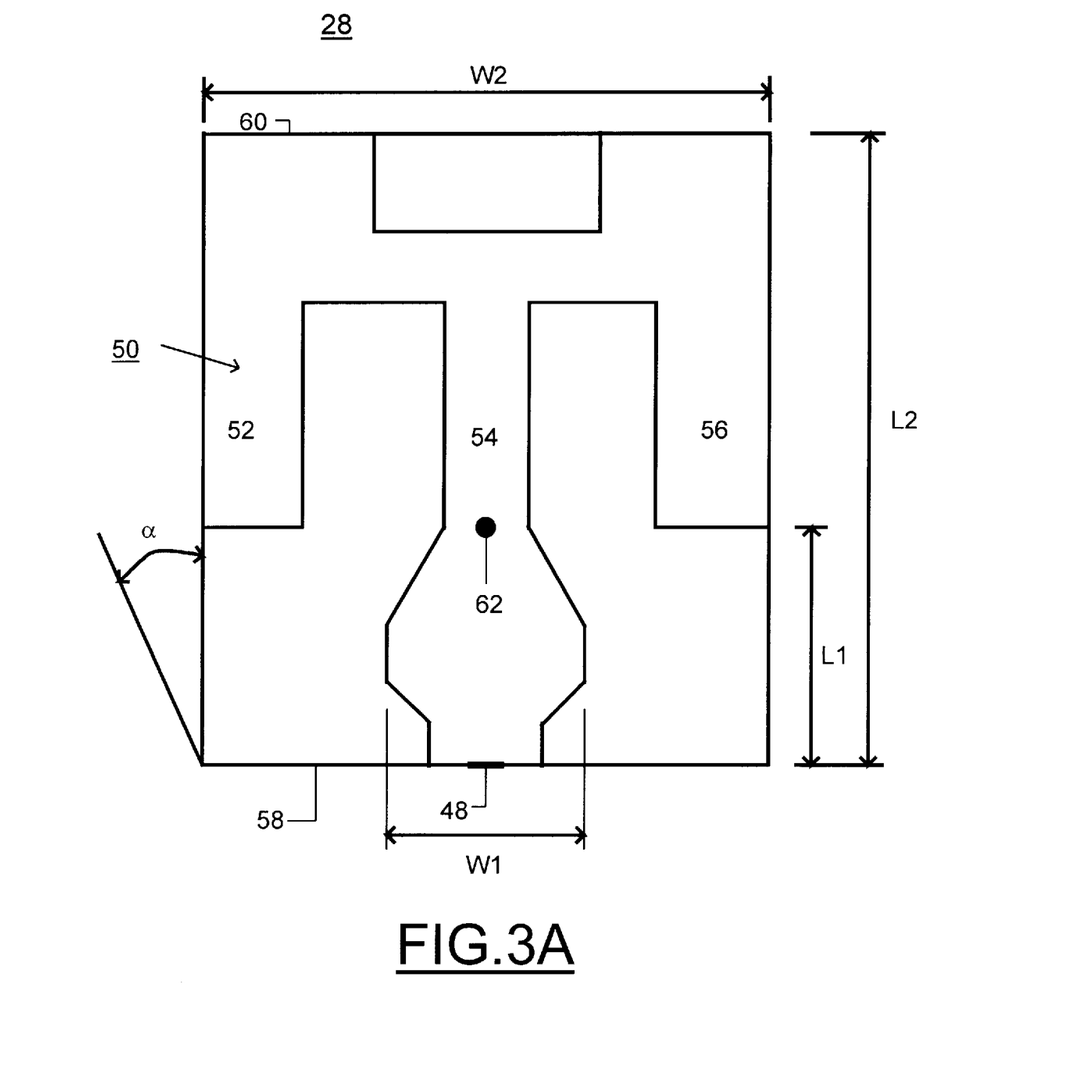
FIG. 3A is a bottom plan view of an exemplary airbearing slider of a data storage disk file of FIG. 1.
Figure 3B:
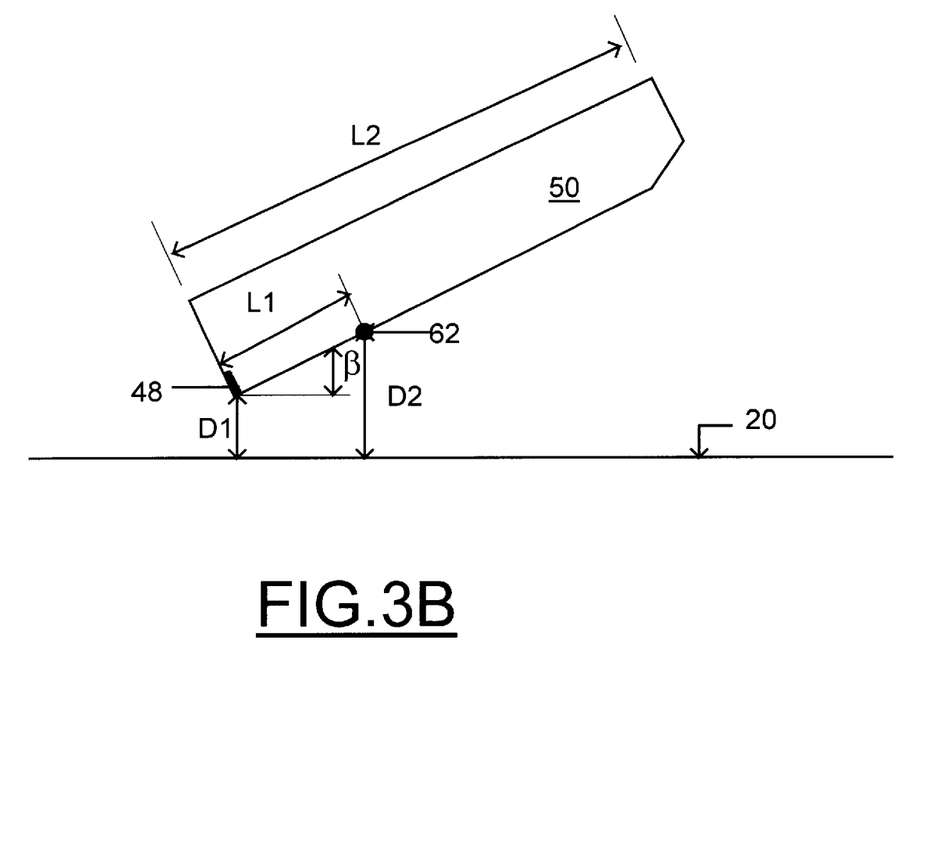
FIG. 3B is a side view of an exemplary airbearing slider of a data storage disk file in FIG. 1.

Referring to FIG. 3A, at least one read/write head, such as a magnetoresistive (MR) read and inductive write head 48, is supported by an exemplary airbearing slider 50 of a data storage disk file 10. FIG. 3A provides a bottom plan view of the airbearing slider 50 of the transducer head assembly 28. In operation of the disk file 10, the air bearing head slider 50 floats above a corresponding rotating disk surface 20. For a typical negative pressure airbearing slider 50 as shown below in FIG. 3A, there are three airbearing rails 52, 54, and 56. Slider 50 includes a rear side 58 and a front side 60. Typically the front side 60 is higher than the back or rear side 58, at a positive pitch angle $\beta$ as shown in FIG. 3B. Contact between these airbearing rails 52, 54, and 56 and the disk surface 20 can occur anywhere on these three rails 52, 54, and 56. The severity of contact is defined by the amount of head-to-disk interference. In operation, the front 60 of the slider 50 is at a much greater height relative to the disk surface 20 than the back 58 of the slider 50. At least one recording and playback element 48 normally is located at the center and back of the center rail 54 but can in general be located anywhere along a rail 52, 54, or 56. It is generally preferred to place the transducer head elements 48 as close as possible to the disk surface 20.

In general, the greater the amount of head-disk interference the more likely that a catastrophic head crash will occur at some time. Due to the slider pitch angle $\beta$, the slider 50 as shown in FIG. 3A will contact a disk defect at the point having the least height at the back of the center rail 54. Disk defects of a greater height are required to contact the side rails 52 and 56. Let us define the head-to-disk spacing at point of the read/write element 48 to be D1. If the slider 50 flies with some positive pitch angle $\beta$ (see FIG. 3B) then the head-to-disk spacing at a point corresponding to the label 62 on the center rail 54 in FIG. 3A is called D2 and is equal to:

D2=D1+L1 sin $\beta$;

where L1 is the distance from the back of the center rail 54 to the back of the side rails 52, and 56, as shown in FIG. 3A.

For example, the degree of severity for head-disk contact can be defined as follows. Let IH be the head-to-disk interference.

If D1<IH<D2; then severity$\geq$1

If IH$\geq$D2; then severity$\geq$5

Intermediate severity levels 2–4 are defined as head-disk interferences between D1 and D2. Severity levels above 5 are defined for disk interferences greater than D2.

In accordance with the invention, the width of the no-idle zones is defined as a function of the slider airbearing geometry and the severity of contact. Note in FIG. 3A that the width of the center rail 54 at the back 58 of the slider is labeled W1. The total width of the slider 50 is labeled W2. The overall length of the slider is labeled L2. Also shown in FIG. 3 is a skew angle $\alpha$. The skew angle $\alpha$ is the angle of the transducer head element 48 with respect to the disk surface 20. Given these dimensions and the degree of severity of contact as defined above, a no-idle zone width WNIZ is defined conservatively as follows:

If 1<severity<5; no-idle zone width WNIZ=(width, W1)*cos α+(length, L1)*sin α

If severity>5; no-idle zone width WNIZ=(width, W2)*cos α+(length, L2)*sin α

In accordance with the invention, composite mapping is provided to determine the no-idle zones and also to find the correct seek timing start so that during a seek mode, head-disk contact with a disk defect does not occur.

Figure 4A:
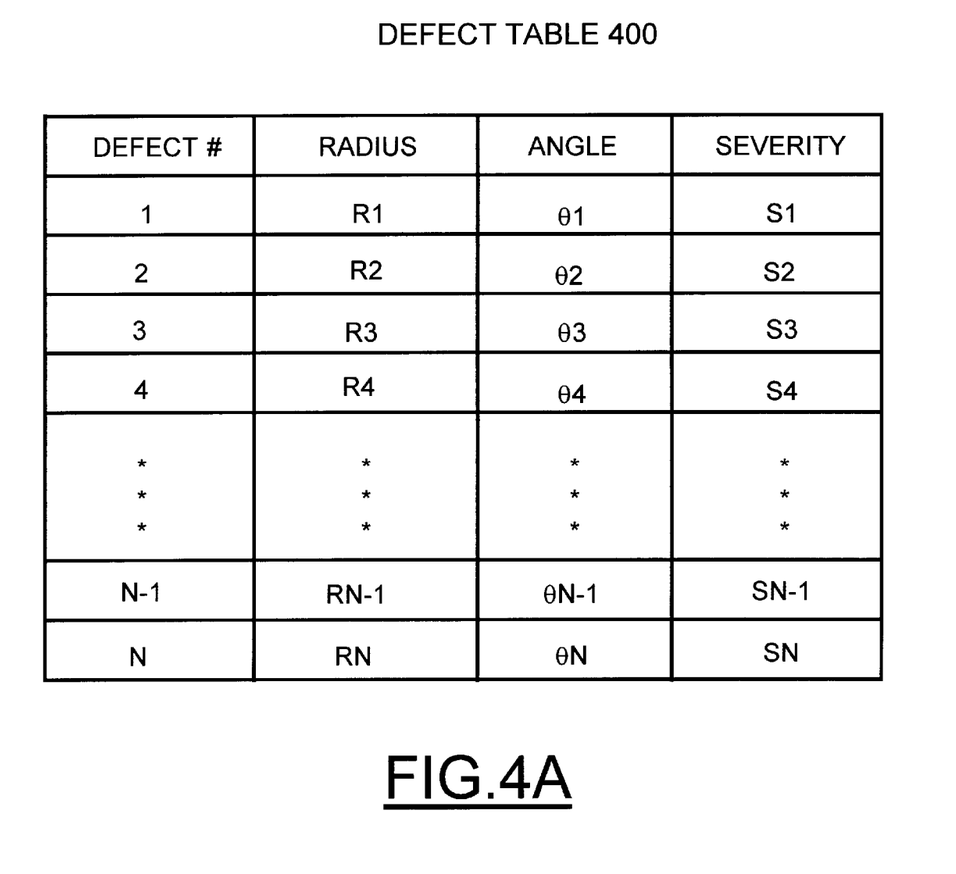
FIG. 4A is a table illustrating a map of defect locations and severity of a data storage disk of FIG. 1.

FIG. 4A provides an exemplary defect table 400 providing a map of defect locations and severity for a data storage disk file 10. Defect table 400 stores for each defect, an identifying number, 1-N, together with a corresponding radius R1–RN, angle θ1–θN and severity S1–SN. Conventional techniques for in-situ detection and classification of disk surface defects are used to identify the defects 1-N, together with the corresponding radius R1–RN and the corresponding angle θ1–θN. The disk drive's surface 20 is dynamically mapped (in-situ) to identify the locations (head#, track#, sector#) of defects including bumps and thermal asperities, that could potentially lead to a head crash and to identify the degree of defect severity S1–SN, as illustrated and described with respect to FIG. 5.

To begin, consider the case where there is only one disk defect to be avoided. Suppose the defect is located at some disk radius=$R_{defect}$, and angle $\theta_{defect}$. The angle $\theta_{defect}$ can be defined relative to a fixed point on the disk surface 20. The slider geometry and degree of severity of contact is used to define a required width of the no-idle zone, as described above.

Figure 4B:
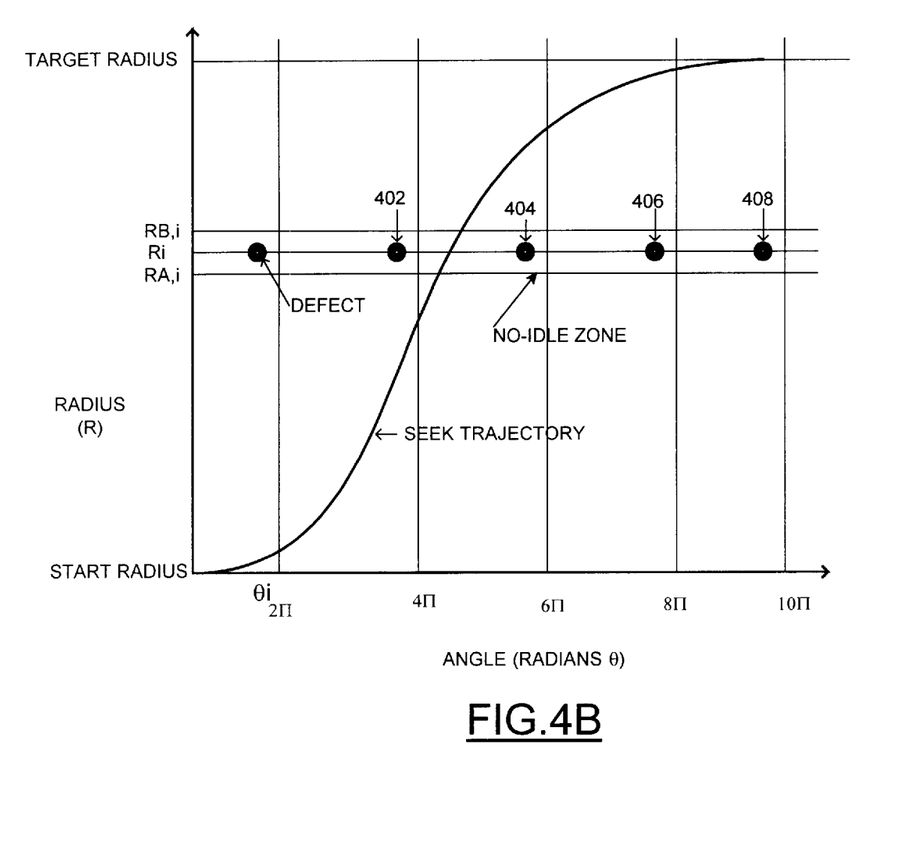
FIG. 4B is a chart providing a two-dimensional representation of a disk defect on a disk surface along with a no-idle zone and acceptable slider trajectory during a seek mode of the preferred embodiment in a data storage disk file of FIG. 1.

In FIG. 4B, a disk defect labeled DEFECT is shown on a 2-dimensional plot, where the horizontal axis is labeled angle (radians θ) and the vertical axis is labeled radius (R). The disk defect DEFECT is located at some angle θi and radius Ri. One rotation of the disk corresponds to 2Π radians. Multiple disk revolutions are shown on the horizontal axis. Each disk revolution corresponds to 2Π radians so multiples of 2Π correspond to multiple revolutions. The disk defect DEFECT also appears for subsequent disk revolutions and thus repeats at multiple locations, 402, 404, 406, and 408, as shown. Only five disk revolutions are shown for clarity reasons. An identified no-idle zone is shown relative the disk defect DEFECT between RA,i and RB,i labeled NO-IDLE ZONE. Also shown is an acceptable slider trajectory at a line labeled SEEK TRAJECTORY for the seek mode so that the slider 50 does not contact the disk defect DEFECT during a seek mode from a START RADIUS to TARGET RADIUS. A width of the NO-IDLE ZONE depends on the airbearing geometry and degree of contact severity as described above.

The slider trajectory, labeled SEEK TRAJECTORY, depends on several factors inherent in the design of the actuator servo system in a disk file 10. These include actuator acceleration and velocity profile during the seek mode. The effect of the file parameters can be described by referring to FIG. 4C which shows a radial velocity profile versus time for a slider 50 during the seek mode.

Figure 4C:
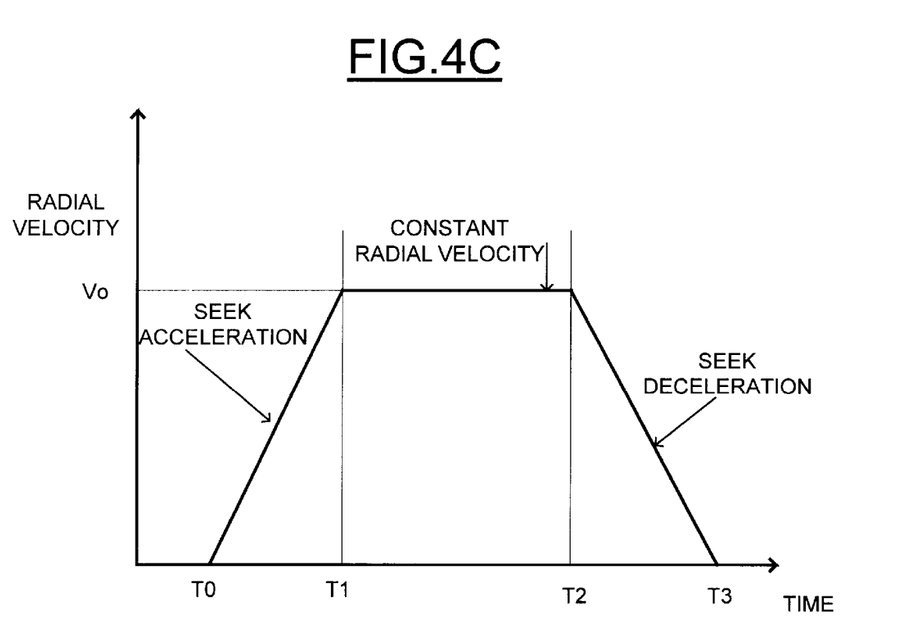
FIG. 4C is a chart providing a radial velocity profile during a seek mode in a data storage disk of FIG. 1.

In FIG. 4C, the horizontal axis represents time and the vertical axis represents radial velocity. The slider 50 begins accelerating during a seek operational mode represented by a line labeled SEEK ACCELERATION. The slope of the line SEEK ACCELERATION defines the acceleration. At a time T1 the maximum radial velocity Vo is reached. From time T1 until time T2, the radial velocity is essentially constant at Vo at a line labeled CONSTANT RADIAL VELOCITY. As the seek destination is approached, the radial velocity decreases. This decrease is shown as a line labeled SEEK DECELERATION. Thus between time T2 and the time T3 at which the destination or target is reached the slider 50 decelerates. The deceleration is defined by the slope of this line SEEK DECELERATION.

Knowledge of the particular radial velocity profile characteristics of FIG. 4C for a particular disk file 10 is used to determine the precise location of a slider 50 on the disk surface 20 during a seek. To understand how the seek profile of FIG. 4C is used to determine head position, the following development is offered.

The angular position of a head 48 relative to a fixed rotational index is given as:

$$\theta(t) = \theta_0 + \omega t \qquad (1)$$

where t is time; $\theta_0$ is some initial angle; and ω is the disk rotational velocity.

The radial position of a slider 50 during a seek can be expressed in terms of the radial seek velocity as:

$$R(t) = R_0 + \int_0^{tseek} v(t)dt \qquad \text{Equation 2}$$

where $R_0$ is some initial radius for a slider 50; v(t) is the radial velocity of a slider and $t_{seek}$ is the length of time required for the seek.

Using equations 1 and 2, it is therefore straightforward to predict where a slider 50 will be during a seek. The velocity profile for the disk file 10 as shown in FIG. 4C allows one to determine the velocity versus time which in turn is used with equation 2 to find the time required to reach the radius where a disk defect is located. Knowing this time allows one to determine the angular position θ(t) of the head using equation 1.

The allowable proximity of a slider 50 to a protruding disk defect is chosen so that with the worst case uncertainty of the velocity profile data, no part of a slider hits the defect during a seek. A reasonable criteria is that the angular proximity should be no less than the slider length L2, seen in FIG. 3.

An algorithm for assigning logical data cylinders to physical data cylinders is completed before the surface analysis test (SAT), which is performed to assign or reassign in case of data errors logical sectors to physical sectors. The cylinder assignment can be understood from the following example.

Assume that a disk drive has 4,000 cylinders, and one protruding defect centered on cylinder #1000. Based on the severity of the protruding defect and the slider geometry, a 400 cylinder wide no-idle zone is defined between cylinder #801 and cylinder #1200. The logical cylinder assignment is shown in the table 1 below.

The disk drive would then sequentially filled up according to the logical cylinder starting with cylinder #0 and finally ending with cylinder #4000, if the disk drive was upgraded when storage had reached 90% of disk drive capacity, then nothing would be written in physical cylinders 801–1200. See the table 1 below.

TABLE 1

| Logical Cylinder | Physical Cylinder |
|---|---|
| 0–800 | 0–800 |
| 801–3600 | 1201–4000 |
| 3601–4000 | 801–1200 |

The heads would only move through this no-idle zone between cylinder #801 and cylinder #1200 during seeks.

Any idling is done outside of the no-idle zone. In case the defect severity is low, such as S=1, and the non-idle zone is recorded with data information, such as non-frequently used, archival type of data, then the disk drive control 14 minimizes the time the recording head assemblies 28 stay in the no-idle zone to the seek and latency time for reading or writing data. If a defect is grown and/or becomes severe, then logical cylinders are reassigned such that the no-idle zone becomes a no-read/write zone. The no-read/write zone can only be accessed through in case of a seek, and no idling within the zone is permitted.

Figure 5:
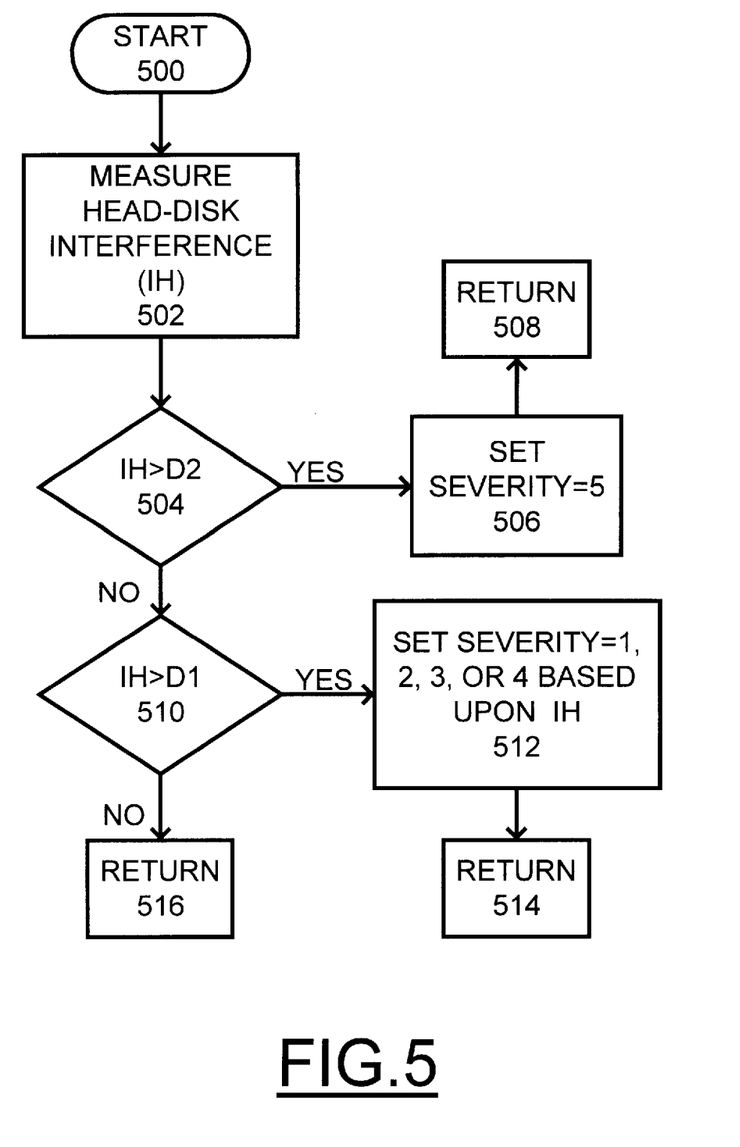
FIG. 5 is a flow chart illustrating sequential operations for mapping defects and determining severity of head-disk contact in a data storage disk file of FIG. 1.

FIG. 5 illustrates sequential operations for determining severity of head-disk contact disk defects performed by control unit 14 begin as indicated at a block 500. Head-disk interference (IH) is measured as indicated at a block 502. The measured IH value is compared with a predetermined value D2 as indicated at a decision block 504. If IH is greater than D2, then the severity is set equal to a maximum value, such as set equal to 5 as indicated at a block 506. Then the sequential operations return as indicated at a block 508 for processing a next disk defect. If IH is less than or equal to D2, then the measured IH value is compared with a predetermined value D1 as indicated at a decision block 510. If IH is greater than D1, then the severity is set equal to 1, 2, 3, or 4 based upon IH as indicated at a block 512. Then the sequential operations return as indicated at a block 514 for processing a next disk defect. Otherwise, if IH is less than or equal to D1, then the sequential operations return as indicated at a block 516 for processing a next disk defect.

Figure 6:
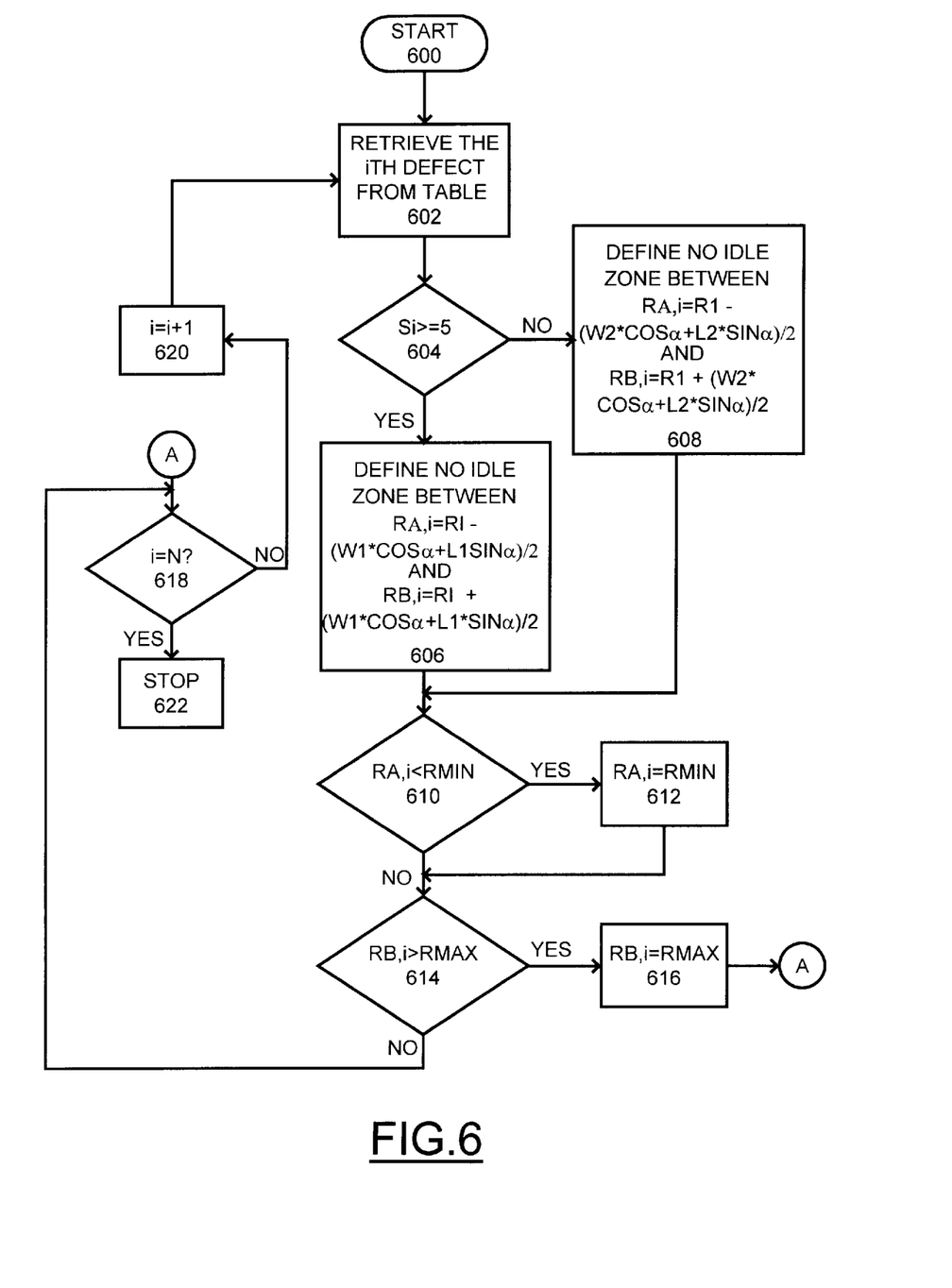
FIG. 6 is a flow chart illustrating sequential operations for defining no-idle zones in a data storage disk file of FIG. 1.

FIG. 6 is a flow chart illustrating sequential operations for defining no-idle zones of a data storage disk file 10. The cylindrical no-idle zones, where idling is prohibited, are set up based on the composite defect map for the disk file 10. As described above, the width (in cylinders) of the no-idle zone is a function of the slider dimensions or footprint and the skew angle α. For example, with the slider 50 having a width by length of 2 mm×1.5 mm and where the skew angle varies (7–20 degrees) from the inner diameter (ID) to the outer diameter (OD) of the disk surface 20, results in a footprint or no-idling zone of 350 to 430 cylinders, at a track density of 5,000 tpi. There may be, for example, a total of one or two protruding defects per disk drive 10 at the time a drive is shipped from the factory. As the disk drive 10 ages the number of defects may increase as well as their severity.

In FIG. 6, the sequential operations for defining no-idle zones begin as indicated at a block 600. An initial defect is retrieved from the defect table as indicated at a block 602. The severity of the retrieved defect is compared with a predetermined level, such as 5, as indicated at a decision block 604. When the severity of the retrieved defect is less than the predetermined level, then the no-idle zone is defined between $RA,i=R1-(W1^*\cos \alpha + L1^*\sin \alpha)/2$ and $RB,i=R1+(W1^*\cos \alpha + L1^* \sin\alpha)/2$ as indicated at a block 606. Otherwise, when the severity of the retrieved defect is greater than or equal to the predetermined level, then the no-idle zone is defined between $RA,i=R1-(W2^*\cos \alpha + L2^* \sin\alpha)/2$ and $RB,i=R1+(W2^*\cos \alpha + L2^* \sin\alpha)/2$ as indicated at a block 608. Having reference also to FIG. 3, note that a significantly larger no-idle zone is defined at block 608 when the retrieved defect is greater than or equal to the predetermined level as compared to the no-idle zone defined at block 606. Then the calculated no-idle zone boundary value RA,i is compared with a minimum radius value RMIN as indicated at a decision block 610. When the calculated no-idle zone boundary value RA,i is less than the minimum radius value RMIN, then RA,i is set equal to RMIN as indicated at a block 612. Then the calculated no-idle zone boundary value RB,i is compared with a maximum radius value RMAX as indicated at a decision block 614. When the calculated no-idle zone boundary value RB,i is greater than the maximum radius value, then RB,i is set equal to RMAX as indicated at a block 616. Then it is determined whether more defects remain as indicated at a decision block 618 labeled i=N? If i does not equal N, then i is incremented as indicated at a block 620. Then the sequential steps are repeated after a next defect is retrieved from the defect table at block 602. Otherwise, when i equals N, then the sequential steps end as indicated at a block 622.

Figure 7:
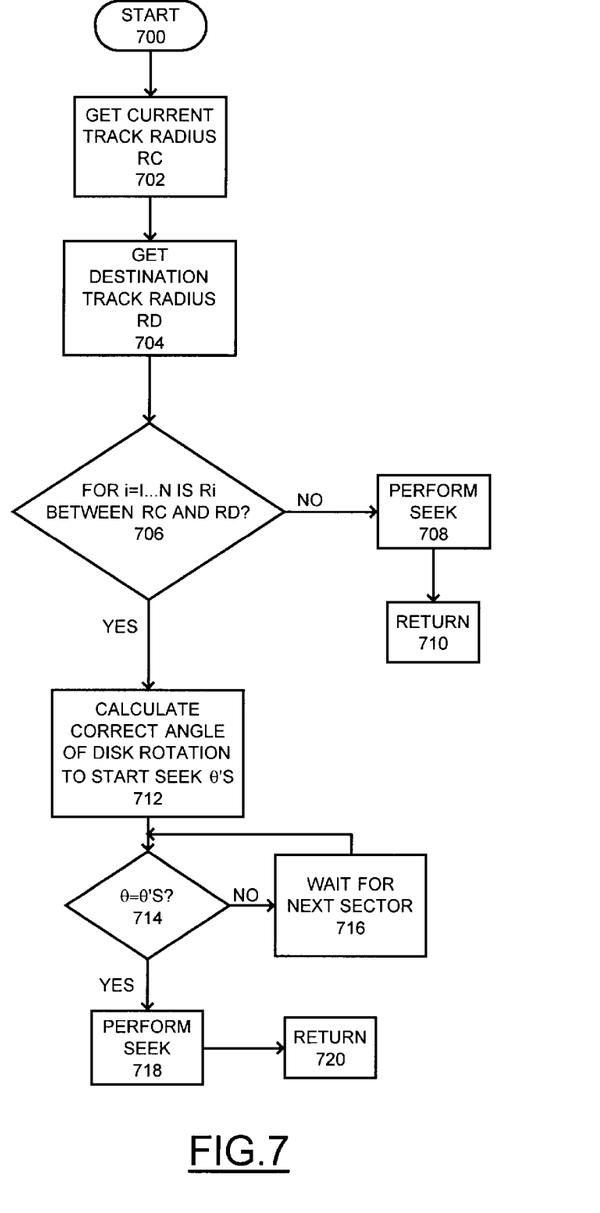
FIG. 7 is a flow chart illustrating sequential operations for seek timing of a data storage disk of FIG. 1.

FIG. 7 is a flow chart illustrating sequential operations for seek timing in accordance with the preferred embodiment starting at a block 700. The current track radius RC is obtained as indicated at a block 702. Then the target or destination track RD is obtained as indicated at a block 704. Then for each defect, i-N in the defect table 400 is compared with the current track radius RC and the destination track RD as indicated at a decision block 706. If the defects i-N are not between the current track radius RC and the destination track RD, then the seek is performed as indicated at a block 708. Then the sequential operations return as indicated at a block 710. Otherwise, when at least one of the defects i-N is between the current track radius RC and the destination track RD, then a correct angle of disk rotation to start seek is calculated as indicated at a block 712. Then the angle of disk rotation is compared with the calculated angle for starting seek as indicated at a decision block 714. If the compared angles are not equal, after waiting for next sector as indicated at a block 716 the angle of disk rotation is compared with the calculated angle for starting seek at decision block 714. When the compared angles are equal, then the seek is performed as indicated at a block 718. Then the sequential operations return as indicated at a block 720.

Figure 8:
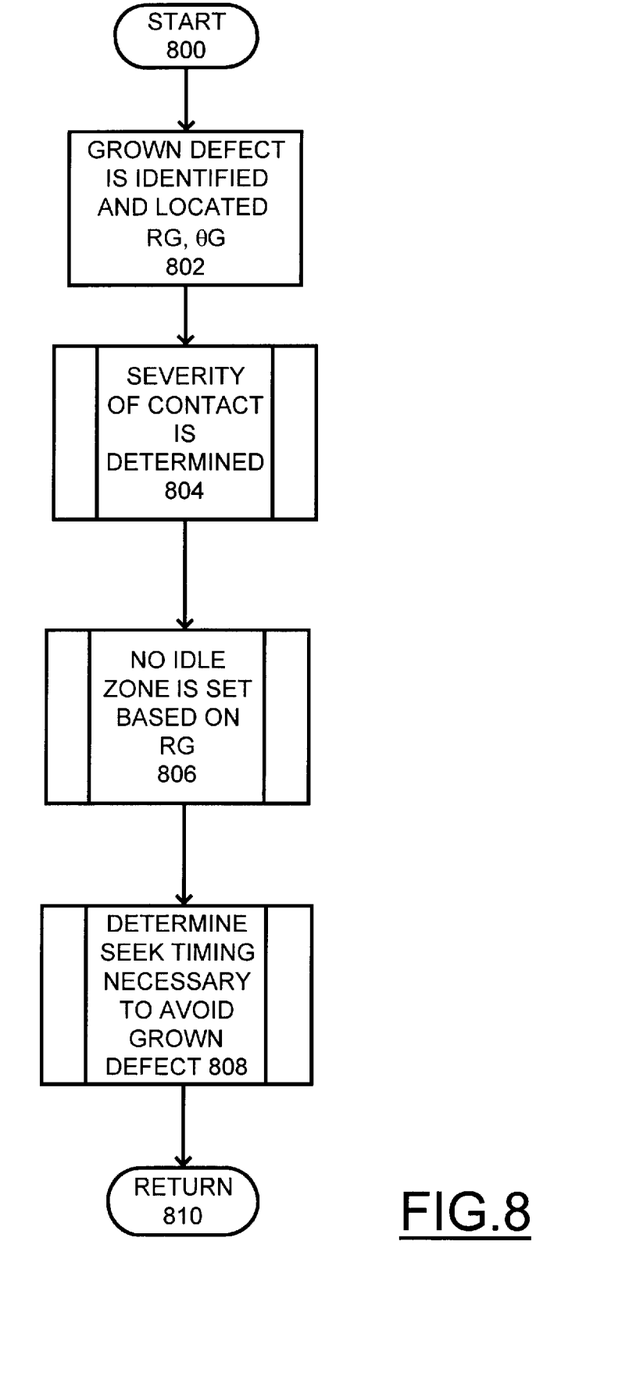
FIG. 8 is a flow chart illustrating sequential operations for an identified grown defect of a data storage disk of FIG. 1.

FIG. 8 is a flow chart illustrating sequential operations for processing an identified grown defect in the data storage disk file 10 beginning at a block 800. First a grown defect is identified and located by radius RG and angle θG as indicated at a block 802. The severity of contact of the identified grown defect is determined by performing the sequential steps of FIG. 5 as indicated at a routine block 804. Next a no-idle zone for the identified grown defect is set by performing the sequential steps of FIG. 6 as indicated at a routine block 806. Next seek timing for the identified grown defect is determined by performing the sequential steps of FIG. 7 as indicated at a routine block 808. Then the sequential operations return as indicated at a block 810.

The actuator seek process is predictable using the available Gray code information for track position and a stored velocity deceleration profile used for the seek. Knowledge of the starting cylinder number, the defective cylinder number, and the target cylinder number, enables calculation of a time value indicating the start of the seek such that the head crosses the no-idle zone away from the protruding defect can be calculated.

For example, assume a disk drive 10 spins at 7,200 RPM or has a revolution time of 8.3 milliseconds, has 4,000 cylinders and 83 sectors per track. Assume that a starting cylinder is cylinder #500 and a target cylinder is cylinder #2500 and that the protruding defect is located on cylinder #1500 and sector #42. Furthermore, assume that we have calculated that the time to reach the defective cylinder TA=5 milliseconds. It can be seen that the period between rotating sectors is 0.1 millisecond, thus it takes 50 sector periods to reach the defective track. Using modulo 83 arithmetic, one can see that starting the seek at Sector #78 would cause the recording heads to arrive at the defective cylinder to hit the defect right on. Thus allowing for some variation one could say that starting at any sector number except Sectors #76, 77, 78, 79, 80 will guarantee that the head will stay away from the defect during this particular seek. Note that for this particular example, the sector numbers start at #0 and end at #82 for a total of 83 sectors.

In the case of multiple protruding defects, more than one no-idle zone is established, and thus the algorithm becomes more complex and the seek start times more limited. The highest priority is given to the most severe defect. It should also be noted that in the case of seeking across two severe defects, can include a first seek temporarily to a cylinder between the two no-idle zones, and then a second seek to the target track.

In brief summary, advantages of the invention are that disk files having protruding disk defects of minor severity identified by the manufacturing glide test can be shipped rather than failing and replacing the disk(s). The invention allows higher manufacturing yields without a substantial adverse impact on potential field crashes. In a disk drive using load/unload, this invention shows a means to avoid hitting any disk defects that may have been created over the life of the drive due to a faulty load or unload. For example, a protruding disk defect in the load zone of a disk can be avoided during a load and unload through knowledge of its circumferential position, the disk rotation rate, and the radial head velocity during a load and unload. Avoidance of the head-to-disk contact by evasive and adaptive maneuvering of the recording heads of the invention, decreases the probability of a head crash caused by a protruding defect, and thus increases the life of the disk drive. It should be understood that the present invention can be used with various types of disk files 10 including CD-ROM and floppy drives.

While the present invention has been described with reference to the details of the embodiments of the invention shown in the drawing, these details are not intended to limit the scope of the invention as claimed in the appended claims.

What is claimed is:

1. A method for mapping protruding defects in a data storage disk file comprising the steps of:
   identifying a protruding disk defect and measuring a head and disk interference value for said identified protruding disk defect;
   comparing said measured head and disk interference value with at least one predetermined threshold value; and
   storing with a location of said identified protruding disk defect a severity value responsive to said compared values.

2. A method for mapping defects in a data storage disk file as recited in claim 1 further includes the step of defining a no-idle zone responsive to said stored severity value.

3. A method for mapping defects in a data storage disk file as recited in claim 1 further includes the step of providing start seek timing responsive to said stored severity value with said location of said identified protruding disk defect.

4. A method for mapping defects in a data storage disk file as recited in claim 3, wherein said step of providing start seek timing responsive to said stored severity value with said identified protruding disk defect includes the steps of obtaining a current track radius and obtaining a destination track radius for a seek operation; comparing said obtained current track radius and said obtained destination track radius with said location of said identified protruding disk defect.

5. A method for mapping defects in a data storage disk file as recited in claim 4, further includes the step of responsive to an identified location of said identified protruding disk defect between said obtained current track radius and said obtained destination track radius, calculating an angle of disk rotation to start said seek operation and comparing a disk angle with said calculated angle and starting said seek operation responsive to a match of said compared angles.

6. A method for mapping defects in a data storage disk file as recited in claim 1 further includes the step of defining a no-idle zone utilizing said stored severity value and predefined dimensions of a slider.

7. A method for mapping defects in a data storage disk file as recited in claim 1 wherein the step of storing with said location of said identified protruding disk defect said severity value responsive to said compared values includes the steps of identifying a defect radius and a defect angle value for said identified protruding disk defect and storing said severity value with said identified defect radius and said identified defect angle.

8. A method for mapping defects in a data storage disk file as recited in claim 1 further includes the steps of identifying a grown protruding disk defect and identifying a radius and an angular location of said grown protruding disk defect.

9. A method for mapping defects in a data storage disk file as recited in claim 8 further includes the steps of measuring a head and disk interference value for said identified grown protruding disk defect; comparing said measured head and disk interference value with a predetermined threshold value; and responsive to said compared values, storing a severity value with said location of said identified grown protruding disk defect.

10. A method for mapping defects in a data storage disk file as recited in claim 8 further includes the steps of defining a no-idle zone responsive to said stored severity value of said identified grown protruding disk defect.

11. Apparatus for mapping protruding defects in a data storage disk file comprising:
    means for identifying a protruding disk defect;
    means for measuring a head and disk interference value for an identified protruding disk defect;
    means for comparing said measured head and disk interference value with at least one predetermined threshold value; and
    means for storing with a location of said identified protruding disk defect a severity value responsive to said compared values.

12. Apparatus for mapping protruding defects in a data storage disk file as recited in claim 11 further includes means for defining a no-idle zone responsive to said stored severity value and said stored location of said identified protruding disk defect.

13. Apparatus for mapping protruding defects in a data storage disk file as recited in claim 11 further includes means for providing start seek timing for a seek operation to avoid head contact with said identified protruding disk defect.

14. Apparatus for mapping protruding defects in a data storage disk file as recited in claim 11 further includes means for comparing a defect radius value of said identified protruding disk defect with a current radius and a destination radius for a seek operation; and means responsive to an identified defect radius value between said current radius and said destination radius for calculating a start of seek rotational angle; and means for comparing a disk angle with said calculated start of seek rotational angle and means for starting said seek operation responsive to a match of said compared angles.

15. A data storage device comprising:

a housing;

a data storage medium contained in said housing;

a transducer head assembly contained in said housing;

actuator means connected to said transducer head assembly for moving said transducer head assembly relative to said data storage medium;

control means connected to said actuator means for locating said transducer head assembly relative to said data storage medium;

said transducer head assembly including a slider carrying a transducer head;

said data storage device being characterized by:

means for identifying a protruding disk defect;

means for measuring a head and disk interference value for an identified protruding disk defect;

means for comparing said measured head and disk interference value with at least one predetermined threshold value; and means for storing with a location of said identified protruding disk defect a severity value responsive to said compared values.

16. A data storage device as recited in claim 15 further includes means for defining a no-idle zone responsive to said stored severity value and said stored location of said identified protruding disk defect.

17. A data storage device as recited in claim 16 wherein said means for defining said no-idle zone include means responsive to a predefined severity value for calculating said no-idle zone utilizing a width and a length of said slider.

18. A data storage device as recited in claim 15 includes a CD ROM drive, a flexible disk drive and a rotating storage device.

19. A data storage device as recited in claim 15 further includes means for providing seek timing for a seek operation to avoid head contact with said identified protruding disk defect.

* * * * *